United States Patent
Favor et al.

(10) Patent No.: US 7,490,225 B2
(45) Date of Patent: Feb. 10, 2009

(54) SYNCHRONIZING MASTER PROCESSOR BY STALLING WHEN TRACKING OF COPROCESSOR RENAME REGISTER RESOURCE USAGE COUNT FOR SENT INSTRUCTIONS REACHES CREDITED APPORTIONED NUMBER

(75) Inventors: John Gregory Favor, Santa Clara, CA (US); Christopher P. Nelson, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/555,258

(22) Filed: Oct. 31, 2006

(65) Prior Publication Data
US 2007/0198984 A1    Aug. 23, 2007

Related U.S. Application Data

(60) Provisional application No. 60/757,240, filed on Jan. 9, 2006, provisional application No. 60/731,967, filed on Oct. 31, 2005.

(51) Int. Cl.
*G06F 9/38*    (2006.01)

(52) U.S. Cl. ........................... 712/216; 712/23; 712/217

(58) Field of Classification Search ........................ None
See application file for complete search history.

(56) References Cited

U.S. PATENT DOCUMENTS

| | | | | |
|---|---|---|---|---|
| 4,992,938 A | * | 2/1991 | Cocke et al. ................. | 712/217 |
| 5,708,837 A | * | 1/1998 | Handlogten .................. | 712/23 |
| 5,748,468 A | * | 5/1998 | Notenboom et al. ........... | 700/3 |

* cited by examiner

*Primary Examiner*—Kenneth S Kim
(74) *Attorney, Agent, or Firm*—Osha • Liang LLP

(57) ABSTRACT

Synchronized register renaming between a master processor and a coprocessor that receives operations from the master enables efficient implementation of register renaming and operation execution in the processors. An ideal and an external register allocation map are implemented in the coprocessor. When registers are no longer allocated according to the ideal allocation map and the registers are currently allocated according to the external allocation map, the registers are deallocated in the external map and the number of freed registers is reported to the master. The master increments a free register credit count accordingly, and decrements the credit count by one for each operation issued to the coprocessor. An operation is not issued to the coprocessor unless at least a register is free according to the credit count. The master also throttles coprocessor operation issue based on a credit count corresponding to free scheduler entries available in the coprocessor.

24 Claims, 12 Drawing Sheets

| Cycle | Master Processor Activity | Coprocessor Activity |
|---|---|---|
| 0 | Coprocessor load is in master processor REN stage. | |
| 1 | Master processor sends coprocessor load to coprocessor.<br><br>Coprocessor load is scheduled by master processor SCH stage. | |
| 2 | Coprocessor load is in master processor RF stage.<br><br>Master processor asserts LdIssue_rf. | Coprocessor load is in coprocessor REN stage.<br><br>Coprocessor records allocated destination for load data. |
| 3 | Coprocessor load is in mater processor EX stage. | Nothing happens immediately regarding the coprocessor load issue notification. |
| 4 | Coprocessor load is in master processor DCA stage.<br><br>Master processor sends 0 on LdEarlyRetry_dca. | Coprocessor wakes up dependent coprocessor reg.ops in the WAK stage. |
| 5 | Coprocessor load is in master processor DFR stage.<br><br>Master processor asserts LdComplete_dfr. | Coprocessor looks up the destination for load data.<br><br>Dependent coprocessor reg ops are in the SCH stage. |
| 6 | Coprocessor load is in master processor WB stage.<br><br>Coprocessor load is removed from scheduler. | The coprocessor load is removed from the rename table, and dependencies are cleared from the coprocessor scheduler entries.<br><br>Dependent coprocessor reg ops are in the RF stage.<br><br>Coprocessor bypasses the load data to dependent ops in the RF stage. |
| 7 | Later coprocessor load in master processor REN stage re-uses master processor scheduler entry.<br><br>Master processor sends later coprocessor load to coprocessor. | Coprocessor writes load data to the register file and bypasses the load data to dependent ops in the RF stage. |

Fig. 4

| Cycle | Master Processor Activity | Coprocessor Activity |
| --- | --- | --- |
| 0 | Coprocessor store is in master processor REN stage. | |
| 1 | Master processor sends coprocessor store to coprocessor. | |
| 2 | | Coprocessor store is in coprocessor REN stage. |
| 3 | | Producer of coprocessor store data is sent to master processor. |
| 4 | Master processor wakes up coprocessor store. | |
| 5 | Coprocessor store is scheduled by master processor SCH stage. | |
| 6 | Coprocessor store is in master processor RF stage.<br><br>Master processor asserts StIssue_rf. | |
| 7 | Coprocessor store is in master processor EX stage. | Coprocessor translates master processor scheduler entry number into physical source register number. |
| 8 | Coprocessor store is in master processor DCA stage.<br><br>Master processor sends 0 on StEarlyRetry_dca. | Coprocessor reads register file. |
| 9 | Coprocessor store is in master processor DFR stage.<br><br>Master processor asserts StComplete_dfr. | Coprocessor sends coprocessor store data to master processor. |
| 10 | Master processor handles coprocessor store data. | Coprocessor decrements register reference count. |

Fig. 5

SYNCHRONIZING MASTER PROCESSOR BY STALLING WHEN TRACKING OF COPROCESSOR RENAME REGISTER RESOURCE USAGE COUNT FOR SENT INSTRUCTIONS REACHES CREDITED APPORTIONED NUMBER

CROSS-REFERENCE TO RELATED APPLICATIONS

The present application is related and claims priority to (a) U.S. provisional patent application, entitled "Synchronized Register Renaming in a Master Processor and a coprocessor," Ser. No. 60/731,967, filed on Oct. 31, 2005, and (b) U.S. provisional patent application, entitled "Extended Resource Credit Scheme to Support Dynamic Reassignment of Resources among Data Producers," Ser. No. 60/757,240, filed on Jan. 9, 2006. These provisional patent applications are hereby incorporated by reference in its entirety. The present application is also related to (a) U.S. nonprovisional patent application, entitled "Synchronized Register Renaming In A Multiprocessor," Ser. No. 11/555,263, filed on Oct. 31, 2006 and (b) U.S. non-provisional patent application, entitled "Dynamic Resource Allocation," Ser. No. 11/555,253, filed on Oct. 31, 2006. These nonprovisional patent applications are hereby incorporated by reference in its entirety.

BACKGROUND

The present invention relates to microprocessors, including microprocessors having multiple processing units.

SUMMARY

According to one embodiment of the present invention, a microprocessor having a master processor and a coprocessor, and an associated synchronized renaming method are provided. The synchronized method includes (a) sending from the master processor an operation for execution by the coprocessor along with an identifier, (b) at the coprocessor, scheduling the operation for execution; and (c) upon completing execution of the operation on the coprocessor, notifying the master processor using the identifier.

In one embodiment, the operation is executed on a pipeline of the coprocessor. The operation may include a register operation or a memory operation.

In one embodiment, the identifier includes an index into a scheduler table in the master processor. In one embodiment, resources allocated in the coprocessor are associated with and looked up through the identifier.

According to another aspect of the present invention, the master processor is allocated a predetermined number of operations that are allowed to be outstanding in the coprocessor. The master processor keeps track of the number of outstanding operations and stalls when that number reaches the predetermined number.

In one embodiment, the master processor is allocated a number of resources in the coprocessor for executing operations that are sent from the master processor. The master processor keeps track of the resources allocated to the outstanding operations and stalls when the resources allocated to the outstanding operations reach the number of resources allocated to it.

In one embodiment, the number of resources that are released in each coprocessor cycle to be allocated for operations sent by the master processor is limited to a predetermined limit. The predetermined limit is set to be the number of resources that can be allocated by operations sent from the master processor to the coprocessor in one coprocessor cycle.

In one embodiment, the coprocessor maintains an actual resource allocation map and an external resource allocation map to keep track of actual resources available and to shadow the resource allocation consistent with the resource allocation viewed by the master processor.

In one embodiment, the resource allocation maps are implemented as bit vectors.

BRIEF DESCRIPTION OF THE DRAWINGS

FIG. 4 includes table 400 which summarizes the activities in master processor 101 and coprocessor 102 for a coprocessor load operation.

FIG. 5 includes table 500 which summarizes the activities in master processor 101 and coprocessor 102 for a coprocessor store operation.

DETAILED DESCRIPTION

Figure 2:
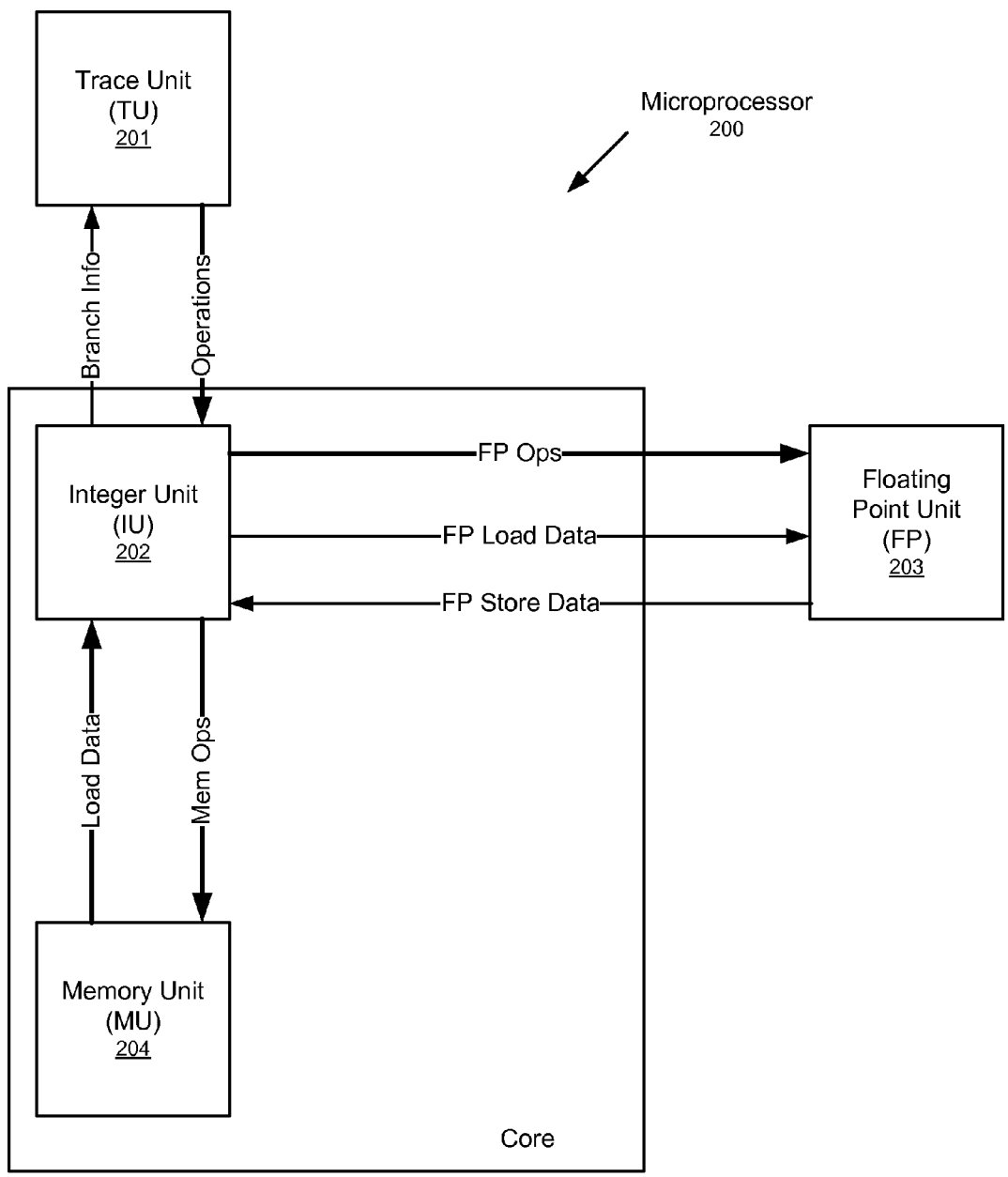
FIG. 2 shows one example of a microprocessor that has multiple processing units.

FIG. 2 shows one example of a microprocessor (microprocessor 200) that has multiple processing units. As shown in FIG. 2, microprocessor 200 includes trace unit (TU) 201, integer unit (IU) 202, floating point (FP) unit 203 and memory (MU) unit 204. TU 202 provides operations to be executed in microprocessor 200. In one embodiment, an instruction in the instruction set for microprocessor 200 is implemented as a group of operations, sometimes referred to as "microinstructions" to those skilled in the art. IU 202 receives these operations and handles their renaming and execution. Some of these operations may be operations that are executed within IU 202. Other operations may be sent by IU 202 for execution in FP 203. In this detailed description, "renaming" refers to readying the operations, such that a scheduler may schedule the operations for execution in a processing unit. Renaming includes assigning the necessary resources (e.g., registers) for the execution. Assigning registers to an operation is sometimes referred to as "register renaming."

For the purpose of this detailed description, a processing unit that sends operations for execution by another processing unit is referred to as a "master processor"; relative to the master processor, the processing unit that receives the operations is referred to as a "coprocessor". Often, it is desirable to have the master processor and the coprocessor operate independently, so as to reduce complexity and control signal overhead. Data dependence, however, necessitates synchronization of coprocessor and master processor operations at some level.

Typically, microprocessor 200 has access to a memory system that may include a main memory and a hierarchical cache system. MU 204 provides an interface to such a memory system. In this embodiment, operations may be "register operations" or "memory operations". In a register operation, operand data is sourced from one or more registers (or an equivalent source—such as data obtained from a register bypass mechanism). The result of a register operation is sent to a destination register. A typical microprocessor may have a register file shared among the processing units, or have registers that are dedicated for use by specific processing units, or both. In a memory operation, data may be fetched from a location in the memory system and loaded into a register (i.e., a "load operation") or read from a register to be stored into a location in the memory system (i.e., a "store operation.") In microprocessor 200, as shown in FIG. 2, memory operations related to FP 203 are also handled by MU 204, but coordinated through IU 202.

FIG. 2 also shows that IU 202 and MU 204 form a "core." A core refers to a collection of processing or functional units, including their resources, that together provide the ability to execute all or substantially all operations. Modern microprocessor, such as microprocessor 200, may have multiple cores. For example, although not shown in FIG. 2, microprocessor 200 may include multiple cores each including an integer unit and a memory unit.

Although FIG. 2 shows only a floating point unit (FP 203) as a coprocessor, microprocessor 200 may have other processing units that may function as coprocessors. For example, processing units for executing specialized multimedia instructions ("MMX") or for a streaming SIMD[1] extension ("SSE") architecture may be implemented.

[1] SIMD stands for Single Instruction Multiple Data streams. SIMD is a form of parallel execution that applies the same operations on multiple data streams.

Figure 3:
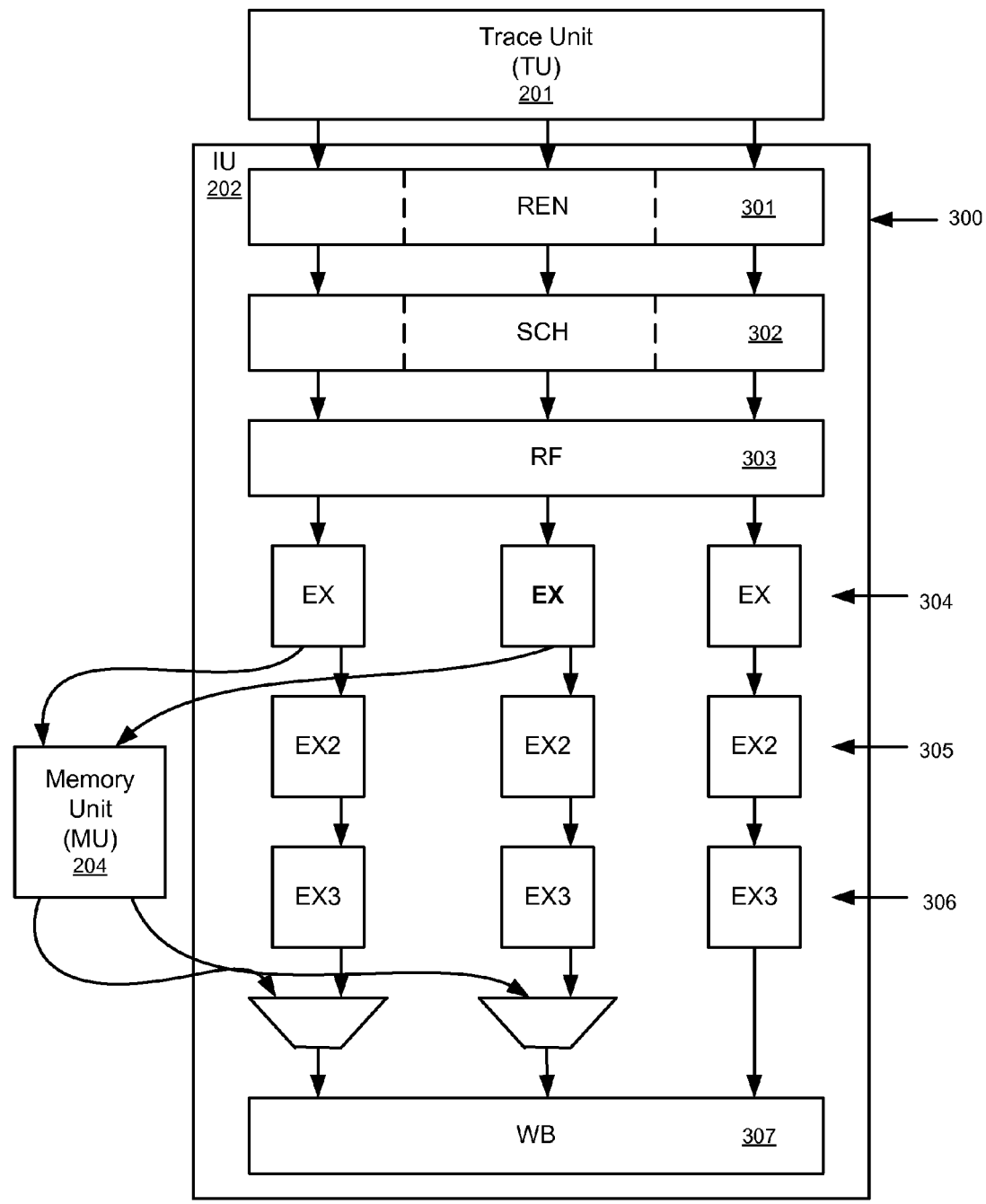
FIG. 3 shows one pipeline arrangement that can be used to implement operation execution in IU 202 of FIG. 2.

In IU 202, an operation is processed through several steps from receipt into IU 202 to completion of execution. The timing and control of these steps may be organized by a pipeline. FIG. 3 shows one pipeline arrangement (pipeline 300) that can be used to control operation execution in IU 202. For illustrative purpose, pipeline 300 cam receive up to three operations in each processor cycle simultaneously. Operations received from TU 201 are processed for renaming during renaming (REN) stage 301 of pipeline 300. Successfully renamed operations are processed in scheduling (SCH) stage 302 for issuance. An issued operation is passed to register fetch (RF) stage 303 during which the operands are fetched from registers specified during renaming. Operations may require different lengths of time to complete execution. Pipeline 300 provides execution stages 304-306 (EX1, EX2 and EX3) in three parallel execution steams to accommodate operations of different execution times. Results from operations that complete after execution stage 304 or after execution stage 305 may be bypassed to subsequent operations without delay, while the results are staged through execution stages 305-306 to write back (WB) stage 307 to the designated registers. Memory operations (i.e., load and store operations) are sent to MU 204 after RF stage 303. For a load operation, the data retrieved from the memory system join results from register operations to be written back to specified register at write back stage 307.

Execution in a coprocessor may be controlled using a pipeline similar to pipeline 300 of FIG. 3. Memory unit 204 may have its own pipeline for memory operations.

FP 203's interface with each master processor, including IU 202, is specific. Events associated with the interface between FP 203 and IU 202 have little direct impact on the interface between FP 203 and another master processor. FP 203 may have, for example, two schedulers each assigned to handle the operations sent from a master processor (e.g., IU 202). The scheduler for each master processor may accept up to a fixed number of operations (e.g., 3) per coprocessor cycle. The physical registers of the FP 203 are resources that are shared among the main processors.

The present invention provides a method for synchronized register renaming by a master processor and a coprocessor to enable the processors to execute operations independently and out of order, if desired, while maintaining synchronization through a mutually understood resource usage.

Figure 1:
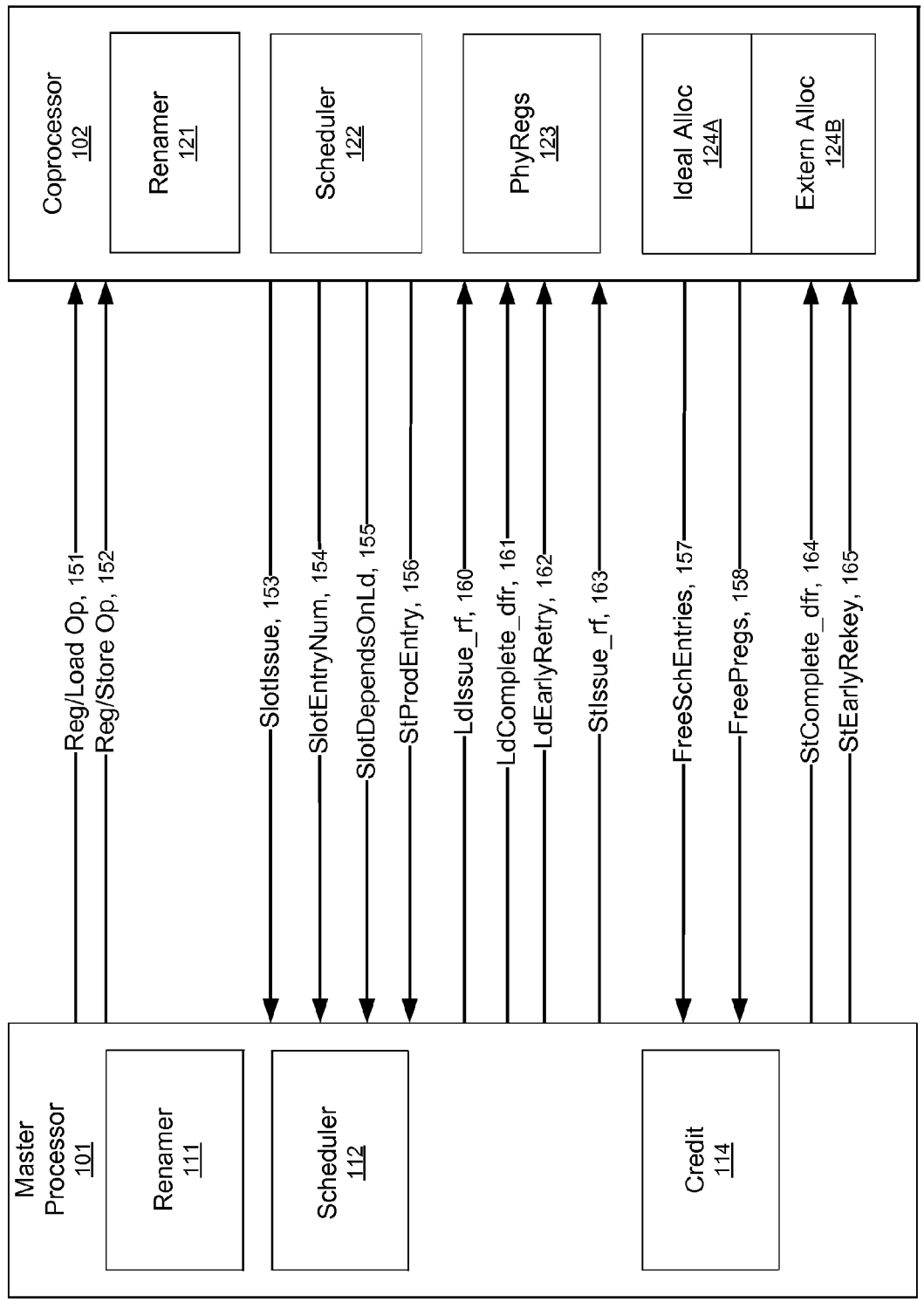
FIG. 1 illustrates, in a microprocessor having multiple processing units, master processor 100 and coprocessor 101 using a synchronized register renaming method, in accordance with one embodiment of the present invention.

FIG. 1 illustrates a generalized scheme for achieving synchronization between a coprocessor and the master processor for operations assigned to the coprocessor, through a synchronized register renaming method. FIG. 1 shows in master processor 101, renaming unit or renamer 111, scheduler 112, and credit unit 114 that are relevant to one embodiment of the present invention. Similarly, FIG. 1 shows, in coprocessor 102, renaming unit 121, scheduler 122, physical registers 123, ideal allocation unit 124A, and external allocation unit 124B, that are relevant to that embodiment of the present invention. In this embodiment, up to three coprocessor operations may be sent from master processor 101 to coprocessor 102 per cycle. When three operations are sent, the operations may be, for example, a register operation, a store operation or a load operation, and a load operation. As shown in FIG. 1, as indicated by reference numeral 152, a register operation and a load operation, for example, are sent in the same coprocessor cycle. Similarly, as indicated by reference numeral 152, a register operation and a store operation are sent in the same coprocessor cycle. Of course, the number of operations that can be sent in the same coprocessor cycle is a matter of design and implementation choice, and does not limit any aspect of the present invention.

Where coprocessor 102 is accessed by more than one core (i.e., in addition to master processor 101), resources in coprocessor 102 may be statically or dynamically assigned or allocated to each accessing core, depending on the implementation. Dynamic allocation imposes greater management overhead, but may achieve a higher performance. Coprocessor resources so assigned may include entries in coprocessor 102's scheduler or registers in its physical register file, or both. Coprocessor 102 may be provided a clock signal that is synchronized to an interfacing master processor clock signal, and port interfaces between the processors are defined relative to that clock signal.

As master processor 101 renames operations in renaming unit 111, coprocessor operations are forwarded to coprocessor 102, such as indicated by reference numerals 151 and 152. A credit scheme ensures that execution of these operations will not be stalled in coprocessor 102 due to lack of resources in coprocessor 102. In one embodiment, master processor 101 is allocated a number of entries in a scheduling table of coprocessor 102, and a number of registers from physical registers 123 for carrying out the operations sent from master processor 101. For example, master processor 101 may be allocated 32 credits for the use of 32 registers for the operations it sends to coprocessor 102. Master processor 101 keep tracks of these numbers in a scheduler entry counter and a register counter in credit unit 114. For each register operation sent to coprocessor 102, master processor 101 deducts one unit from the scheduler entry counter and zero or one unit from the register counter. In this embodiment, as only up to three operations may be sent to coprocessor 102 at each coprocessor cycle, the scheduler entry counter may be reduced by a maximum of three per coprocessor cycle. Also, as coprocessor load and coprocessor store operations are not placed in coprocessor 102's scheduler table in this embodiment, the scheduler entry counter is not decremented for these operations. For each coprocessor load operation, one unit is deducted from the register counter. As a coprocessor store operation does not require allocation of a register, the register counter is not decremented for a coprocessor store operation. Similarly, for register operations that do not produce a register result or do not require a register to be allocated, the register counter is also not decremented.

If either counter indicates that its associated resources are exhausted (i.e., coprocessor 102 has run out of resources associated with the counter for the new operation), master processor 101 stalls, and new operations are not sent to coprocessor 102 until sufficient resources are freed up. Thus, master processor 101 does not send operations to coprocessor 102 when coprocessor 102 cannot immediately accept the operations. If the coprocessor operation is a memory operation (i.e., a coprocessor load or a coprocessor store), master processor 101 also puts the operation in its own scheduler. By stalling master processor 101 when necessary, coprocessor 102 does not stall for resource reasons. Thus, master processor 101 may remain in synchronization with coprocessor 102.

As the operations are completed in coprocessor 102, the operations are removed from coprocessor 102's scheduler 122 and any other tables that may reference the operations (e.g., a renaming table in renamer 121 that links each operation to its allocated resources). (The corresponding entries in scheduler 122 are therefore "freed" for reuse.) Coprocessor 102 then sends the number of freed scheduler entries ("FreeSchEntries") to master processor 101, as indicated by reference numeral 157. Coprocessor 102 communicates only up to three freed scheduler entries per coprocessor cycle. Master processor 101 then increments the scheduler entry counter by the number of freed scheduler entries received from coprocessor 102. Similarly, coprocessor 102 signals to master processor 101 in value FreePregs (reference numeral 158) that zero, one, two or three physical registers are made available during the coprocessor cycle. To limit the number of signal lines required, coprocessor 102 signals no more than three physical registers as having been freed in each coprocessor cycle. Master processor 101 accordingly, increments the register counter by the received number of freed physical registers.

In some instances, it may not be necessary that coprocessor 102 allocates a free physical register to each coprocessor register operation or coprocessor load operation. In some instances, the number of coprocessor physical registers that are deallocated in a coprocessor cycle may be greater than three (e.g., when an operation using more than three source and destination registers completes). In those instances, as the present embodiment limits the number of freed physical registers that can be communicated to master processor 101, a mismatch arises between the number of coprocessor physical registers that are available, as seen by master processor 101, and the number of physical registers that are actually available. Thus, coprocessor 101 provides an "ideal" vector of allocated registers in ideal allocation unit 124A. The ideal vector keeps track of registers actually allocated (e.g., pursuant to an optimal allocation algorithm), and the ideal vector does not include registers that would be deallocated according to the optimal algorithm. At the same time, coprocessor 102 also maintains an "external" vector of allocated registers in external allocation unit 124B. The bits that are set in the external vector of allocated registers correspond in number to the master processor's view of available physical registers. Thus, the external vector is more conservative than the ideal vector—i.e., due to the limit on the number of freed register that may be communicated to master processor 101 per processor cycle. As a result, there may be more bits in the external vector asserted than in the ideal vector. Conversely, every bit asserted in the ideal vector is also asserted in the external vector. A clean-up algorithm is invoked to gradually correct the mismatch.

For every coprocessor register operation or coprocessor memory load operation, coprocessor 102 allocates a register from the set of cleared bits in the external vector. If coprocessor 102 supports a register re-use algorithm (i.e., coprocessor 102 allows the operation to reuse an already allocated physical register), coprocessor 102 may allocate a register by setting a bit in the external vector, but not set the corresponding bit in the ideal vector, unless the allocated register is actually used. In every coprocessor cycle, coprocessor 102 compares the external vector to the ideal vector, and searches for the first mismatched bit (i.e., a bit set in the external vector but not in the ideal vector) from each end. If a third register is freed during that coprocessor cycle, an additional mismatched bit is found scanning from either end. The mismatched bit or bits, if found, are cleared from the external vector, and the number of bits cleared in the coprocessor cycle is reported to master processor 101, as indicated by reference numerals 158. Of course, the number of bits cleared in the coprocessor cycle may be zero, one or two.

When a large number of registers are freed in the ideal vector during a coprocessor cycle, a number of coprocessor cycles are required to equalize the external vector with the ideal vector, as at most only three register bits are reset or cleared from the external vector per coprocessor cycle in this example. Even though at most three registers per coprocessor cycle are freed, the condition in which the master processor 101 stalls due to a lack of physical registers in coprocessor 102 does not occur, as at most three registers may be allocated per coprocessor cycle. The number of registers that may be allocated per coprocessor cycle is one design consideration for setting the reset or cleared bit limit in the external vector.

When master processor 101 sends to coprocessor 102 a coprocessor load operation or a coprocessor store operation (as indicated by reference numerals 151 and 152), master processor 101 creates an entry in scheduler 112. Master processor 101 also provides coprocessor 102 an identifier that identifies the entry in scheduler 112 allocated to the memory operation (e.g., an index or offset into scheduler 112's scheduling table). Once assigned to a scheduler entry, the corresponding operation stays in the scheduler entry until completion. Coprocessor 102 keeps this identifier ("master scheduler entry number") throughout the pendency of the memory operation. The use of an index into scheduler 112's scheduler table as the identifier is a convenient choice, because the identifier has an independent purpose or hardware significance. Such an identifier may be used, for example, directly in computation to access uniquely at any given time records of the associated operation. Other data objects of hardware significance that can be used as the identifier includes a pointer, an index or an offset to the "reorder buffer" that stores operations that have been committed, or an identifier that relates the operation to the trace in the trace buffer from which it originates. An arbitrary identifier without hardware significance (e.g., a sequence of counts generated by a counter) may also be used. However, such an identifier cannot be used, for example, for address calculation and thus would require expensive logic circuits (e.g., a content-addressable memory) to access the records associated with the operation. Alternatively, a pool of unique identifiers may also be used. In that instance, when an operation is issued to coprocessor 102, one of the identifier in the pool is selected. The selected identifier is returned to the pool when the operation completes.

In this embodiment, master processor 101 and coprocessor 102 communicate over several data and control paths, a portion of which are indicated in FIG. 1. A signal SlotIssue (indicated by reference numeral 153) is provided from coprocessor 102 to master processor 102 and is asserted when a coprocessor operation is internally issued for execution from coprocessor scheduler 122, together with a SlotEntryNum value (indicated by reference numeral 154) which identifies the slot location in coprocessor scheduler 122 that correspond to the coprocessor operation. These signals to master processor 101 are useful for matching information in later processing, such as to resolve store dependencies. A register operation normally completes within a fixed number of cycles, but completion may be predicated if the coprocessor asserts the signal SlotDependsOnLd, indicated by reference numeral 155. Generally, SlotDependsOnLd is asserted when the operation depends on a load operation that has not been completed (i.e., "load in flight"). If the coprocessor does not receive a load completion signal indicating that the load is complete in the coprocessor cycle that SlotDependsOnLd 155 is asserted, then the operation in the slot does not complete after all. Because master processor 101 receives load results earlier than coprocessor 102, master processor 101 may combine a load result with the received signal SlotDependsOnLd 155 to determine whether or not the issued coprocessor operation completes.

When coprocessor 102 renames a coprocessor load operation, a destination physical register is allocated for a corresponding load result. Coprocessor 102 records the destination register number in a table ("renaming table") which is indexed by the master scheduler entry number previously sent from master processor 101. On the master processor 101's side, master processor 101 may execute the coprocessor load (e.g., causes the memory access at MU 204) at any time after renamer 111 completes the renaming of the operation. When scheduler 112 issues the coprocessor load, master processor 101 asserts a signal ("LdIssue_rf", indicated by reference numeral 160) to coprocessor 102, together with the corresponding master scheduler entry number, which coprocessor 102 uses to look up from the table the assigned destination physical register. If the load completes successfully, master processor 101 asserts a successful load completion control signal ("LdComplete_dfr," indicated by reference numeral 161) and sends the corresponding load data. In the following coprocessor cycle, coprocessor 102 writes the load data into the assigned physical register.

Coprocessor 102 may "wake up" or speculatively issue coprocessor register operations that depend on the coprocessor load data, so as to overlap the processing of these coprocessor register operations, while the load data is obtained from the memory system. If an operation in coprocessor 120's RF pipeline stage depends on a previous coprocessor load, coprocessor 102 asserts signal SlotDependsOnLd 155 for the operation. When the load data becomes available, the load data is bypassed to the speculatively issued operations, as necessary.

When the load data is received, the coprocessor load operation completes. Coprocessor 102 invalidates the entry in the renaming table of renamer 121 that is indexed by the master scheduler entry number of the corresponding coprocessor load operation and removes all dependencies on the load from coprocessor scheduler 122, to allow master processor 101 to reuse the same master scheduler entry number for a subsequent coprocessor load without creating ambuiguities.

If a coprocessor load is issued, but does not complete successfully, then signal "LdComplete_dfr" is not asserted. The dependent operations in coprocessor 102's RF pipeline stage, or issued dependent operations at any earlier stage or stages, are canceled. Coprocessor 102 waits for master processor 101 to assert the load issue control signal (i.e., "LdIssue_rf") again before coprocessor 102 resumes speculatively issuing any dependent coprocessor register operations. In this embodiment, master processor 101 also asserts a load early retry control signal ("LdEarlyRetry", reference numeral 162) in an earlier pipeline stage ("DCA" or "data cache access"), if master processor 101 learns that the coprocessor load will not complete in the coprocessor cycle. Such an early warning mechanism may save both power and execution resources.

The above-described activities in master processor 101 and coprocessor 102 are summarized for a coprocessor load operation in table 400 of FIG. 4.

After master processor 101 sends a coprocessor store operation to coprocessor 102, and when coprocessor 102 renames the coprocessor store operation, the source physical register number for the data to be stored and, if the data is not yet available in the source physical register, the scheduler slot number of a previous operation ("producer") that will produce the store data are determined. (Of course, if the data is already available, then there is no producer to wait for). Coprocessor 102 communicates on a bus ("StProdEntry," indicated by reference numeral 156) to master processor 101 what, if anything, the coprocessor store operation is waiting for. The data on bus StProdEntry encodes a value for each coprocessor scheduler entry, a value for each master scheduler number corresponding to a coprocessor load operation, and a value indicating whether or not the data is already available. In response, master processor 101 waits for the operation that will produce the store data to issue, if necessary, by monitoring SlotIssue signal 153 and obtaining slot entry the number ("SlotEntryNum", indicated by reference numeral 154) when SlotIssue signal 153 is asserted. An issuing operation is ignored if it depends on a coprocessor load (indicated by SlotDependsOnLd 155) and the corresponding load does not complete.

When a coprocessor store is issued from scheduler 112, master processor 101 asserts a store issue control signal ("StIssue_rf," indicated by reference numeral 163) and communicates to coprocessor 102 the master scheduler entry number of the coprocessor store. Coprocessor 102 uses the scheduler entry number to look up the renamed source physical register for the coprocessor store. Coprocessor 102 then reads the appropriate register from the physical register file (bypassing if necessary) and sends the data value to the master processor.

When a coprocessor store operation depends on a master scheduler entry number (i.e., a coprocessor load), master processor 101 may speculatively rely on the coprocessor load completing, if the coprocessor load has already reached an execution pipeline stage. If the load successfully completes, the load data is available in the coprocessor in time to be bypassed to the data request by the coprocessor store operation. Once the coprocessor dependency is satisfied and master processor address dependencies are satisfied, the coprocessor store operation may issued. There may be a few coprocessor cycles between a coprocessor register operation issues (so the master processor treats the operation as complete) and when the operation no longer appears as a producer in the renamed operations. Therefore, master processor 101 may need to maintain a record of coprocessor register operations for an implementation-dependent number of cycles to apply to newly renamed coprocessor stores.

If the coprocessor store operation completes successfully, master processor 101 asserts a successful store completion signal ("StComplete_dfr," indicated by reference numeral 164). Coprocessor 102 uses this completion signal to determine when to decrement a reference count for the data source register for the coprocessor store.

Master processor 101 also sends a store early retry control signal ("StEarlyRetry", indicated by reference numeral 165) in an early pipeline stage (e.g., "data cache access" or DCA in a memory system pipeline), if the master processor already knows that the coprocessor store will not complete. Such an early warning may be used to save power and/or execution resources.

The above-described activities in master processor 101 and coprocessor 102 are summarized for a coprocessor store operation in table 500 of FIG. 5.

The credit scheme for managing resources (e.g., executing operations in the coprocessor and the physical registers discussed above) allocates the resources of the coprocessor among the several master processors of microprocessor 100. The resource needs of each master processor may change over time. For example, if each master processor executes a different thread, their needs for coprocessor resources would vary according to the requirements of the threads being executed. The present invention provides a dynamic assignment scheme to balance the resource needs (e.g., physical register usage) for executing operations on behalf of several master processors.

According to one embodiment of the present invention, such a credit scheme may be seen as a method to prevent a data producer from overflowing data-holding resources in a data consumer. As data is produced (e.g., as coprocessor operations issued from a master processor), the data producer decrements a credit count related to the amount of data sent. As data is consumed, (e.g., as the coprocessor completes the assigned operations), the data consumer signals the data producer to restore the credit count related to the data consumed. When the credit count reaches zero, the data producer ("producer") stops producing additional data to avoid overflowing the data consumer ("consumer"); data is produced after credit becomes available again. Such a credit scheme is already described above. When a fixed number of resources are shared among multiple producers, the total credits are shared among the producers. If the credits allocated to each producer are fixed, then each producer is limited to using a fixed fraction of the data-holding consumer resources regardless of their changing resource needs, where the fractions sum to no more than 100%. A dynamic allocation scheme allows each producer's fraction of the data processing resources in the consumer to vary over time, preferably according to the producer's changing needs over time. If one producer has a greater need for resources (e.g. more bandwidth or more capacity) than another producer at any time, resources can be reallocated from the producer of lesser need to benefit the other producer.

To safely reduce credits from a producer (the "yielding producer"), one method first suspends data production by the yielding producer for the time period during which reallocation takes place. An appropriately determined amount of the producer's credits is then taken away and granted to the other producer (the "receiving producer"). The producers would then be made aware of their respective new allocations when operations resume for the yielding producer. In one embodiment, data production at the yielding producer is suspended by the consumer signaling that the credits allocated to the yielding producer have become zero. Subsequently, the consumer releases the resources assigned to the yielding producer in increments over a number of cycles (e.g., by repeatedly releasing the maximum number of freed resource elements that can be communicated each coprocessor cycle), until the credit count reaches the new allocation. The credit counts for the receiving producer may likewise be increased by the consumer releasing more resources than the resources actually freed, until the new allocation for the receiving producer is reached. Under this arrangement, the yielding producer, which has resources to spare, is allocated the overhead burden for the resource reallocation process (i.e., the inconvenience of stalling), while the receiving producer may continue producing data throughout the reallocation process without penalty. In many applications, this is a desirable result.

Figure 6A:
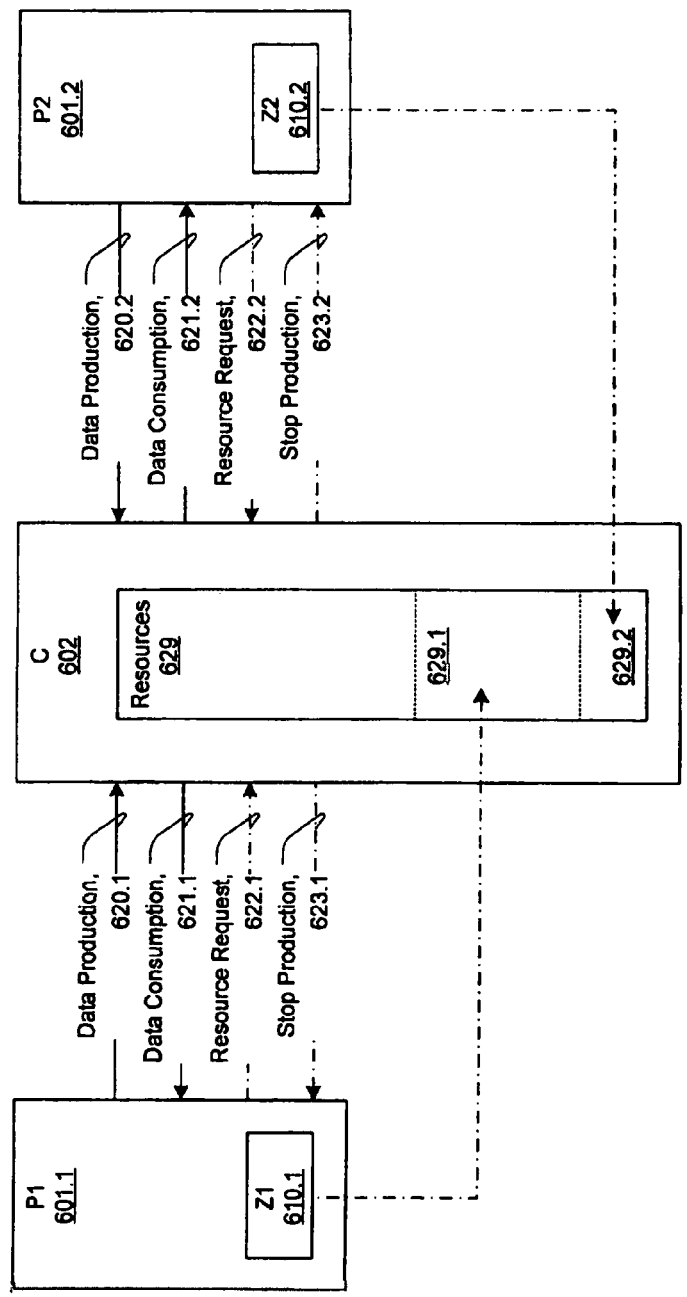
FIG. 6A is block diagram illustrating, in one embodiment of the present invention, an extended resource credit scheme supporting dynamic reallocation of resources among data producers.

FIG. 6A is block diagram illustrating an embodiment of the present invention, in which an extended resource credit scheme supports dynamic reassignment or reallocation of resources among data producers. As shown in FIG. 6A, a single consumer (i.e., consumer 602) receives data from two producers (i.e., producer 601.1 and producer 601.2). In FIG. 6A, reference numerals ending in "0.1" are associated with producer 601.1, and element identifiers ending in "0.2" are associated with producer 601.2. Consumer 602 includes a collection of resources (i.e., resources 629) that are allocated in part between producers 601.1 and 601.2. The resources in consumer 602 allocated to producer 601.1 is illustrated conceptually as 629.1 and the resources in consumer 602 allocated to producer 601.2 is illustrated conceptually as 629.2. Producer 601.1 tracks resources remaining for its use in credit counter 610.1. Producer 601.2 performs similar tracking in credit counter 610.2.

Producer 601.1 signals consumer 602 data produced in a "Data Production" signal bus 620.1[2]. The data produced requires resources from resource allocation 629.1. Consumer 602 signals producer 601.1 data consumed in a "Data Consumption" signal bus 621.1. The data consumed releases or makes available resources from resource allocation 629.1. Credit counter 610.1 indicates the number of resources remaining available to producer 601.1 from resource allocation 629.1. In one embodiment, Data Consumption signal 621.1 may indicate (e.g., via a special token on Data Consumption signal bus) a request to suspend data production and may reset the credit count in counter 610.1 to zero. Alternatively, a dedicated signal (e.g., Stop signal 623.1), may indicate a request to stop data production and may reset the credit count in counter 610.1. A producer may request resource reallocation via a signal such as request signal 622.2 from producer 601.2 to consumer 602.

[2] A signal bus includes one or more signals.

In one embodiment, a producer may produce up to "A" data items in parallel per cycle, and the Data Production signal bus communicates the number (between zero and A) of items produced in any given cycle. The maximum number of data items produced per cycle varies, and may be, for example, one, two, three, or four. Alternatively, each producer may produce a different maximum number of data items per cycle, such that producer 601.1 may produce up to A1 data items per cycle and producer 601.2 may produce up to A2 data items per cycle.

The consumer may consume, for each producer, up to "F" data items in parallel per cycle. The maximum number of data elements consumed per cycle per producer varies, and may be, for example, one, two, three, or four. Alternatively, the number of maximum data items consumed per cycle varies according to producer, such that the consumer may consume up to F1 data items per cycle with respect to producer 601.1 and consume up to F2 data items per cycle with respect to producer 601.2.

The resources in consumer 602 may provide up to "R" resource elements, and zero or more of such elements may be allocated and dynamically reallocated to each of producers 601.1 and 601.2. The number of such elements allocated to producer 601.1 is referred to as "R1" and the number of such elements to producer 601.2 as "R2".

During operation, each producer is initialized with a number of credits reflecting a number of resource elements allocated to it. For example, counter 610.1 is set to R1 reflecting resource allocation 629.1 to producer 601.1. Similarly, counter 610.2 is set to R2 reflecting resource allocation 629.2 to producer 601.2. In each cycle, each producer reduces the number of resource elements required in its respective resource counter for the data items it sent to consumer 602 in that cycle. The data items sent are provided on Data Production bus 620.1 and 620.2. Each producer stops sending data items when the count in its respective resource counter reaches zero. In each cycle, consumer 602 signals on Data Consumption buses 621.1 and 621.2 to indicate to the producers the consumption of their respective data items. In each cycle, each producer increases the count in its resource counter according to the number of resource elements released corresponding to the data items consumed. Thus, a producer may stall when the number of resource elements required by the data items produced to consumer 602 over a time period exceeds the resource elements required by data items consumed.

Figure 6B:
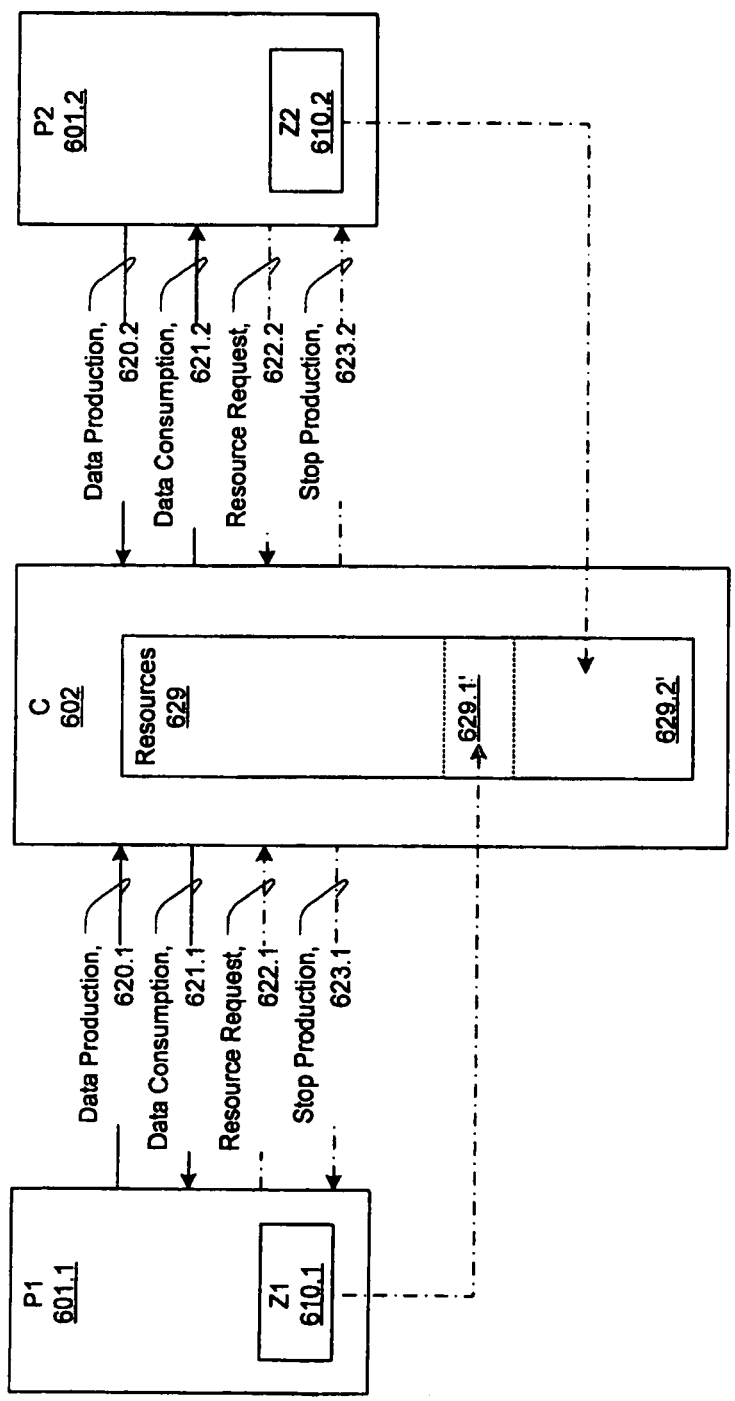
FIG. 6B illustrates increasing the resource allocation to producer 601.2 and reducing resource allocation 601.1 by reassigning a portion of resource allocation 629.1 to resource allocation 629.2, in accordance with the resource credit scheme of FIG. 6A.

FIG. 6B illustrates increasing the resource allocation to producer 601.2 and reducing resource allocation 601.1 by reassigning a portion of resource allocation 629.1 to resource allocation 629.2, in accordance with the credit scheme of FIG. 6A.

Figure 7:
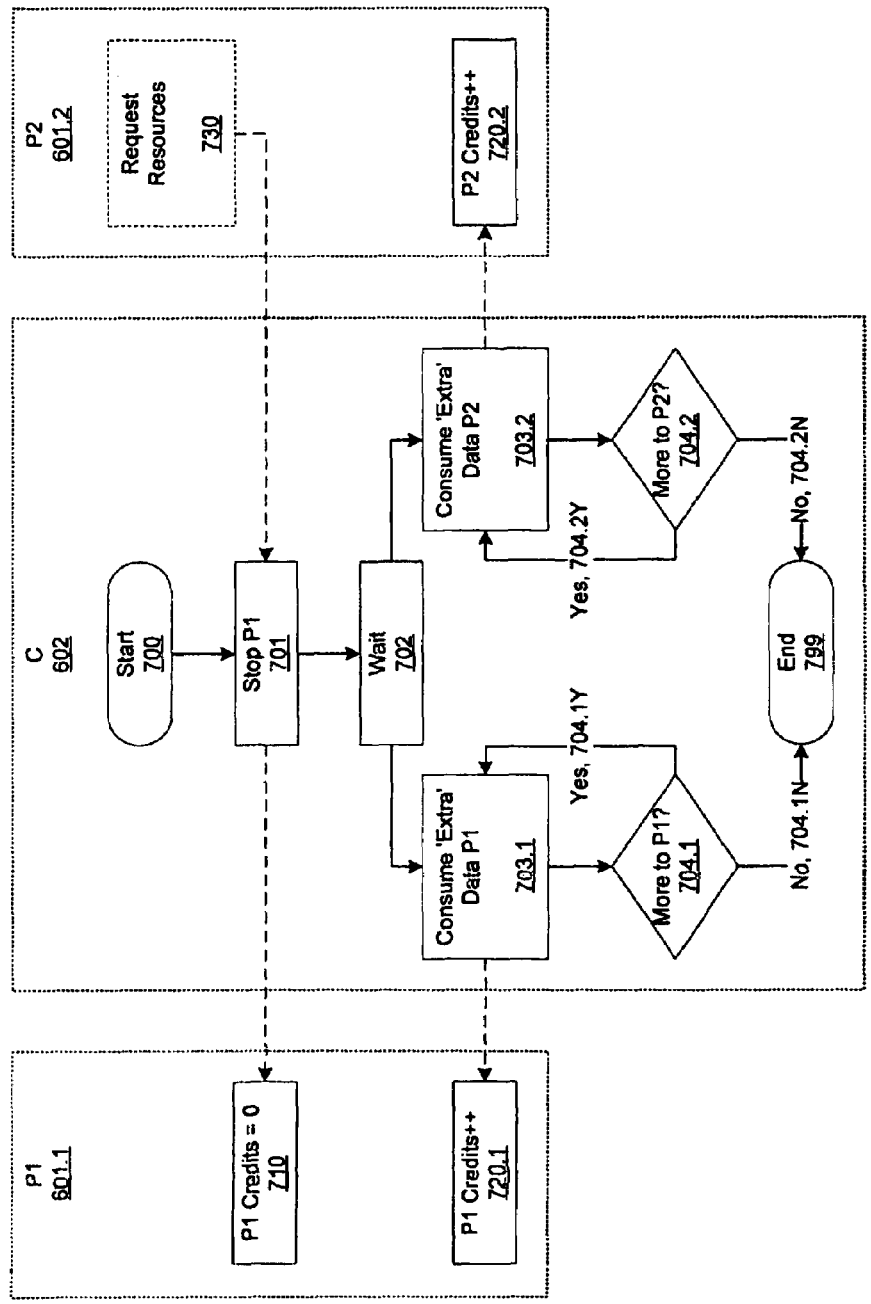
FIG. 7 is a flow diagram illustrating the operations the credit scheme of FIG. 6A.

FIG. 7 is a flow diagram illustrating the operations the credit scheme of FIG. 6A. Conceptually, consumer 602 may dynamically reallocate resources from one producer (e.g. producer 601.1) to another (e.g. producer 601.2) at any time to improve operating efficiency. Resource reallocation may be initiated by any producer or by consumer 602. If reallocation is initiated by a producer, then the requesting producer sends a message to consumer 602 indicating the additional resources desired. At state 701, consumer 602 first ensures that producer 601.1 gives up necessary resource elements from its resource allocation, some of which may be currently in use, so as to ensure that producer 601.1 is within its new resource allocation. For that purpose, consumer 602 sends a "Stop Production" message or signal to producer 601.1. When producer 601.1 receives the Stop Production message, producer 601.1 sets its credit counter 610.1 to zero (state 710) or a predetermined minimum value. Thereafter, while consumer 602 the Stop Production message remains valid, the credit count stays at zero or the minimum value, producer 601.1 sends no further data items to consumer 602. In one implementation, the Stop Production message is a special token sent on the same signal lines as the count of released resource elements. In that implementation, the Stop Production message does not convey a count of released resource elements. Alternatively, if the Stop Production message is separately sent from the count of released resource elements, then producer 601.1 ignores the concurrently received count.

Consumer 602 holds the Stop Production message valid (e.g., by continuing to assert a Stop Production signal line) until the desired resources can be reassigned from producer 601.1. If the resources are not yet available, then consumer 602 waits in state 702 until sufficient data items from producer 601.1 are consumed through normal processing to provide the resources. Even if the resources are available immediately, consumer 602 may still wait in state 702 for at least an amount of time required for the Stop Production message to propagate to producer 601.1 and for any residual data items from producer 601.1 enroute to arrive at consumer 602.

When consumer 602 completes its wait at state 702 (corresponding to, for example, at least the round-trip delay to producer 601.1) and a sufficient number of resources are made available from producer 601.1's former allocation to be reassigned, consumer 602 reallocates the resources from producer 601.1 to producer 601.2.

To signal to producer 601.2 the additional resources available, consumer 602 releases extra resource elements to producer 601.2 than the ones released by consuming data items from producer 601.2 (states 703.2 and 704.2). These extra resource elements increase producer 601.2's ability to send additional data items to consumer 602. The count in counter 610.2 (state 720.2) may potentially reach producer 601.2's new resource allocation. As the increased resource allocation is signaled by the additional resource elements released, a number of cycles may be required to allow producer 601.2 to realize the full benefits of the new resource allocation (i.e., to send sufficient number of additional data items to consumer 602 to fully utilize the new resource allocation). At that point, consumer 602 reaches state 799. If producer 601.2 originates the request for additional resources, and if a messaging protocol requires that producer 601.2 receives an acknowledgement before sending a new request for additional resources, then consumer 602 sends an acknowledgement to producer 601.2 when requested resources are reassigned.

When sufficient resource elements to satisfy the required reassignment are obtained, consumer 602 de-asserts the Stop Production message to producer 601.1. At this point in time, producer 601.1 has zero resource credits available. (In some implementations, it may be possible for consumer 602 to de-assert the Stop Production message to producer 601.1 after producer 601.1 acknowledges the Stop Production message). Consumer 602 signals producer 601.1 its new resource allocation by granting producer 601.1 the proper number credits. As consumer 602 sends the required Data Consumption messages (i.e., states 703.1 and 704.1), producer 601.1 begins sending new data items to consumer 602. The process to bring producer 601.1 to its new allocation may be the same as that described above for producer 601.2 (i.e., reiterating states 703.1 and 704.1). A number of cycles may elapsed before the new resource allocation to producer 601.1 is fully provided (state 799).

As shown in FIG. 7, producer 601.2 continues producing data items in the normal course throughout the reallocation process. As the requirements of each producer may vary over time, the flow illustrated in FIG. 7 may be repeated multiple times throughout the lives of processes executed by producers 601.1 and 601.2, and consumer 602. A producer may request resources more than once, and may resources reassigned to another producer multiple times.

Figure 8A:
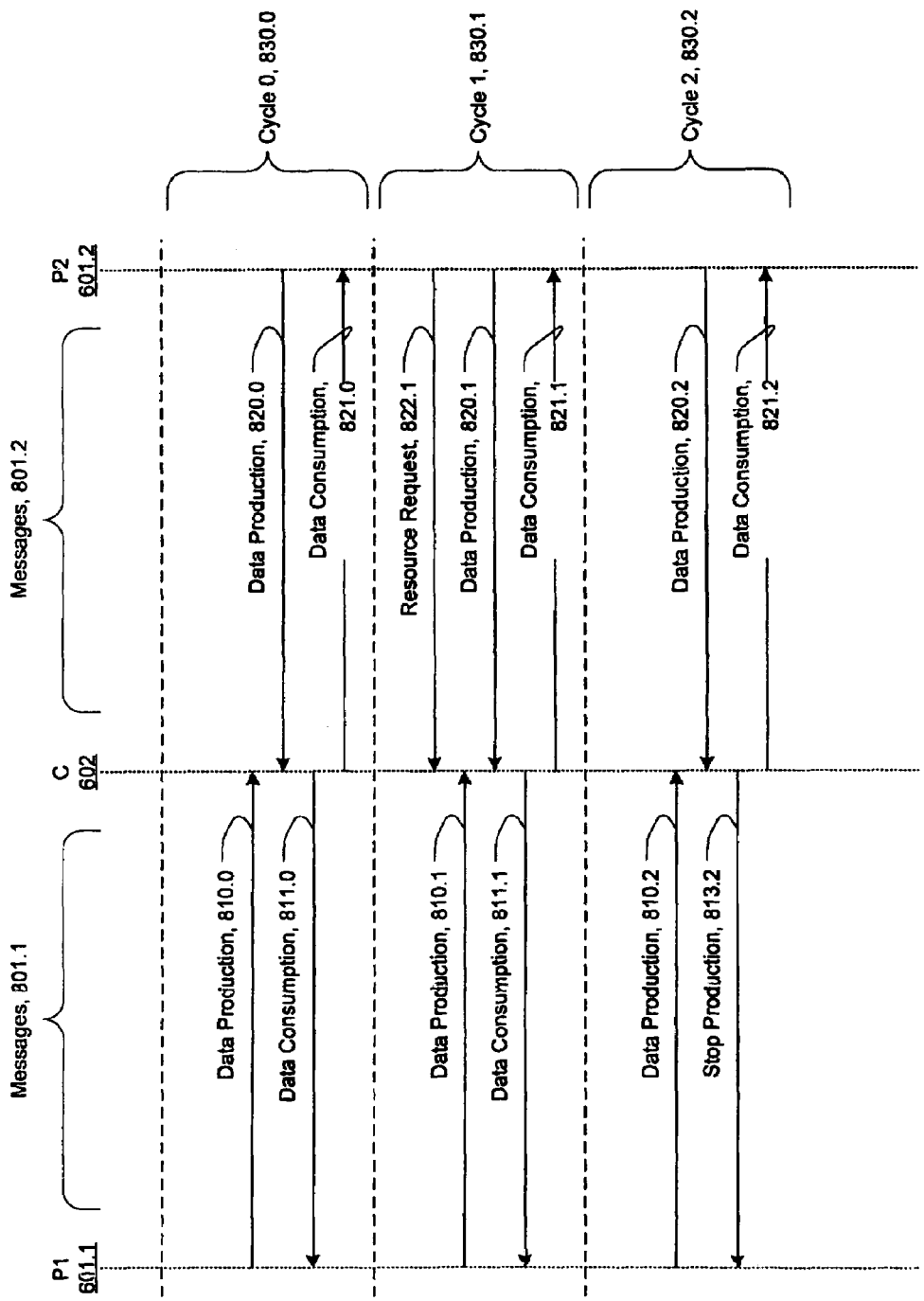
FIGS. 8A, 8B, and 8C show the message traffic among producers 601.1, 601.2 and consumer 602 under a dynamically resource allocation, in accordance with one embodiment of the present invention.
Figure 8B:
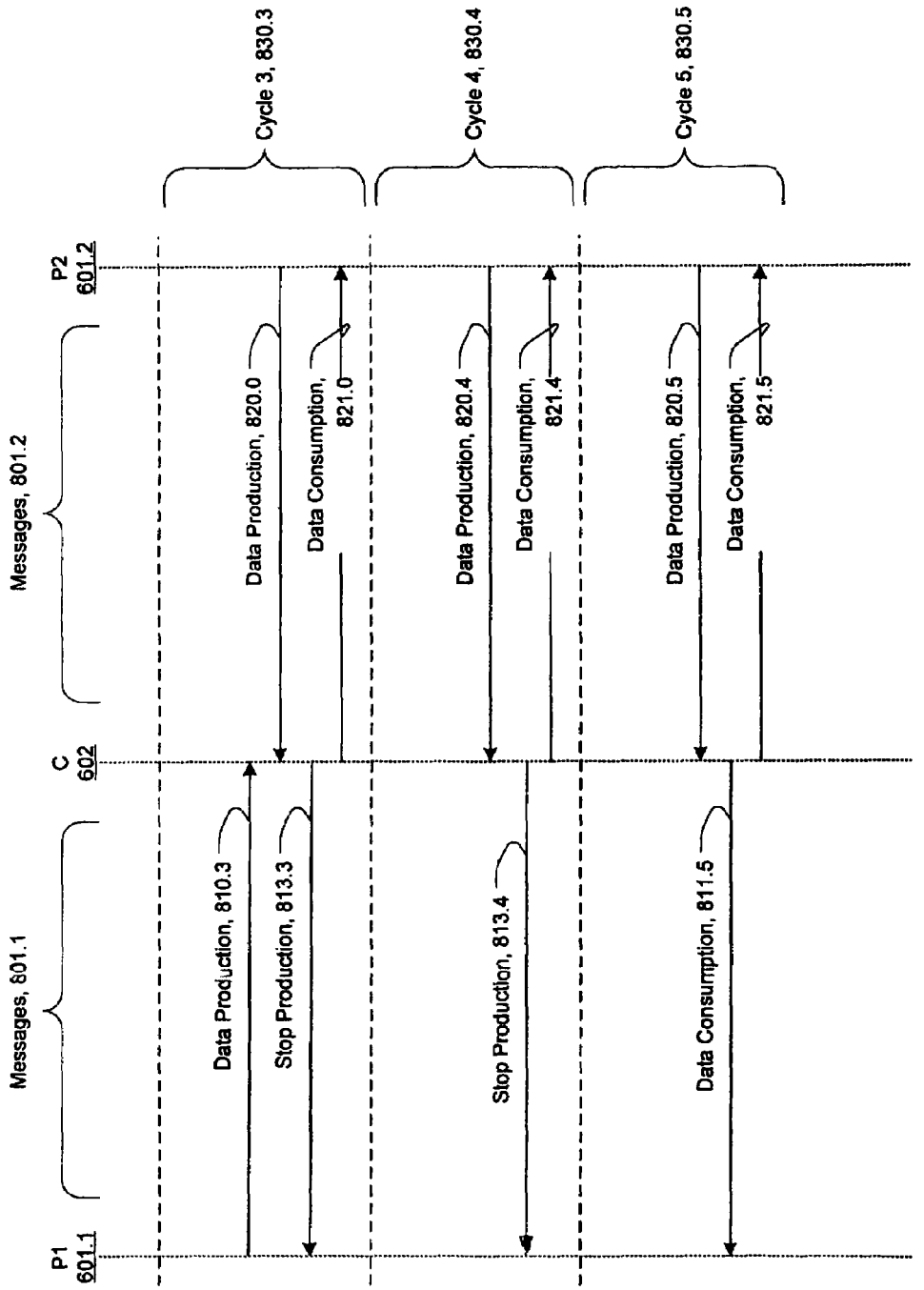
Figure 8C:
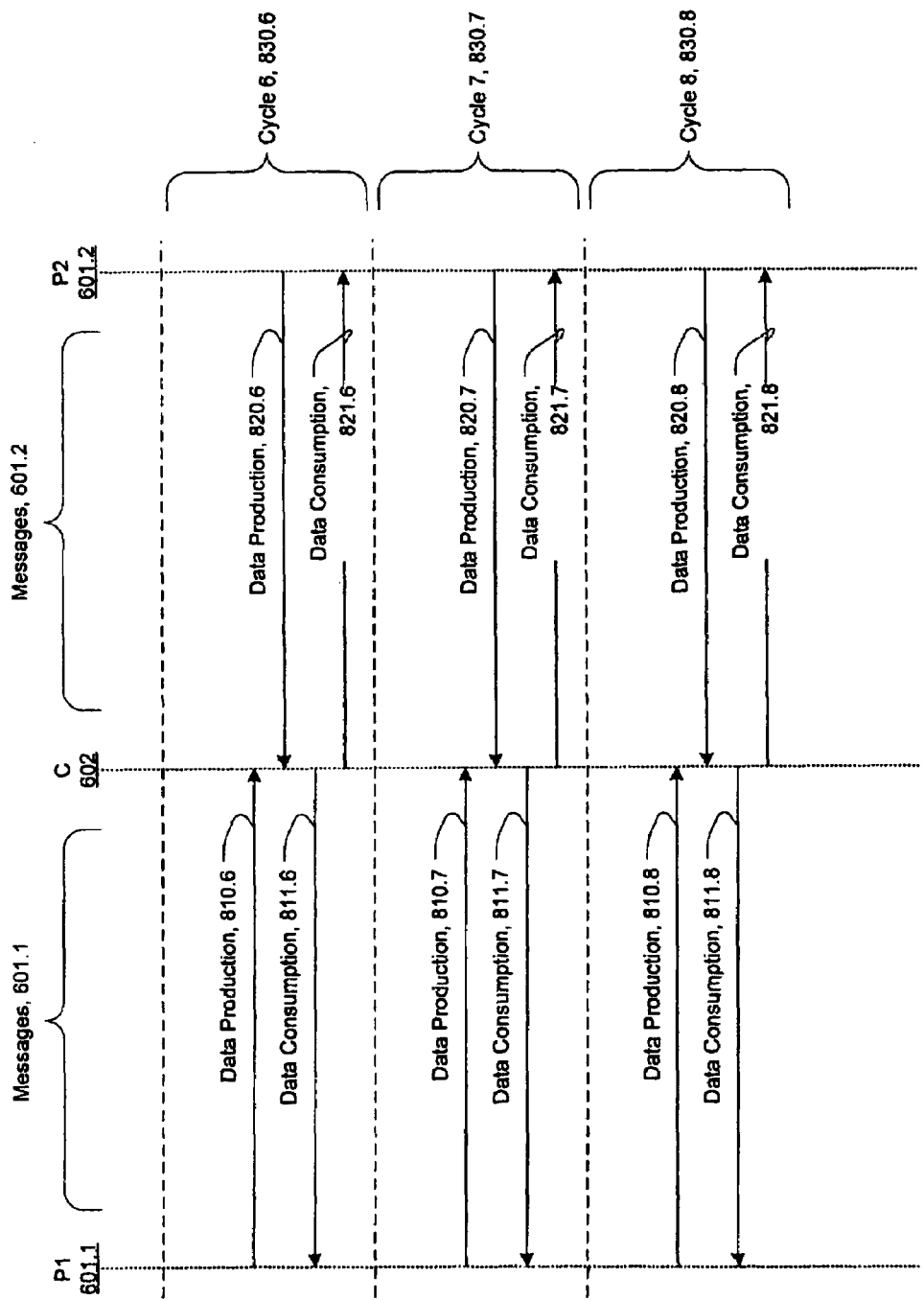

FIGS. 8A-C show the message traffic among producers 601.1, 601.2 and consumer 602 under a dynamically resource allocation over nine cycles, in accordance with one embodiment of the present invention. Communications between producer 601.1 and consumer 602 are illustrated as messages 801.1. Communications between producer 601.2 and consumer 602 are illustrated as messages 801.2. Illustrated messages include Data Production, Data Consumption, Request Resource, and Stop Production. In FIGS. 8A-8C, "Data Production 810.*" refers to a data production message sent during cycle * from producer 610.1 to consumer 602. "Data Production 820.*" refers to a data production message sent during cycle * from producer 601.2 to consumer 602. Similarly, "Data Consumption 811.*" refers to a data consumption message sent from consumer 602 to producer 601.1, and "Data Consumption 821.*" refers to a data consumption message sent during cycle * from consumer 602 to producer 601.2. "Resource Request 822.1" refers to a resource request message sent from producer 601.2 to consumer 602 during cycle 1. "Stop Production 813.*" refers to a stop production message sent during cycle * from consumer 602 to producer 601.1.

Messages in Cycle 0 (830.0 of FIG. 8A) are representative of normal processing (i.e. operations due to the producers producing data and the consumer consuming data without resource reallocation occurring). In Cycle 1 (830.1 in FIG. 8A), producer 601.2 requests more resources via Resource Request message 822.1. In Cycle 2 (830.2 in FIG. 8A), in response to the Resource Request message from the previous cycle, consumer 602 requests by Stop Production message 813.2 producer 601.1 to cease data production and to reset its credit count. In Cycle 3 (830.3 of FIG. 8B), consumer 602 repeats the stop request via Stop Production message 813.3, and even though a stop message was sent in the previous cycle, producer 601.1 still sends data via Data Production message 810.3, as data items previously ready to be sent before it receives Stop Production message 813.2 are sent.

In Cycle 4 (830.4), data from producer 601.1 stops, and consumer 602 reallocates resources. Consumer 602 also continues to assert the stop request via Stop Production message 813.4. Starting in Cycle 5 (830.5 of FIG. 8B), consumer 602 begins sending extra Data Consumption messages (indicating extra resources above the normally released resources) to producer 601.2 to grant reallocated additional resources to producer 601.2. Consumer 602 may also send usual Data Consumption messages to indicate normal Data Consumption. Also starting in Cycle 5 (830.5 of FIG. 8B), consumer 602 ceases sending Stop Production messages to producer 601.1 and begins sending extra Data Consumption messages to producer 601.1. Starting in Cycle 6 (830.6 of FIG. 8C), producer 601.1 may begin sending Data Production messages. Consumer 602 continues (if necessary) to send extra Data Consumption messages to producers 601.1 and 601.2. Starting in Cycle 7 (830.7 of FIG. 8C), consumer 602 may begin sending usual Data Consumption messages to producers 601.1, as data production from producer 601.1 resumed in the previous cycle. In this example, consumer 602 finishes sending extra Data Consumption messages to producers 601.1 and 601.2 during Cycle 7 (830.7 of FIG. 8C) and the resource reallocation is complete. In Cycle 8 (830.8 of FIG. 8C) processing is according to usual data production and consumption (i.e. there are no extra Data Consumption messages).

In some embodiments, the extra and the usual Data Consumption messages to the producers may be interwoven (e.g., in Cycle 5, only extra Data Consumption messages may be sent to each of producers 601.1 and 601.2, while in Cycle 6 only usual Data Consumption messages may be sent to each of producers 601.1 and 601.2.) Alternatively, a usual Data Consumption message may be replaced by an extra Data Consumption message if there is no usual consumption to communicate. In some embodiments the extra and the usual Data Consumption messages may be combined (e.g., in Cycle 5, combined extra and usual Data Consumption messages may be sent to each of producers 601.1 and 601.2). The combined Data Consumption message may account for all of the usual consumption, and if the usual consumption is less than the maximum that can be communicated in a given cycle, then extra data consumption information may be delivered to increase the count in the resource registers.

Producer 601.1 and 601.2 need not be aware that a Data Consumption message releases more resources than actual data consumption provides.

Figure 9:
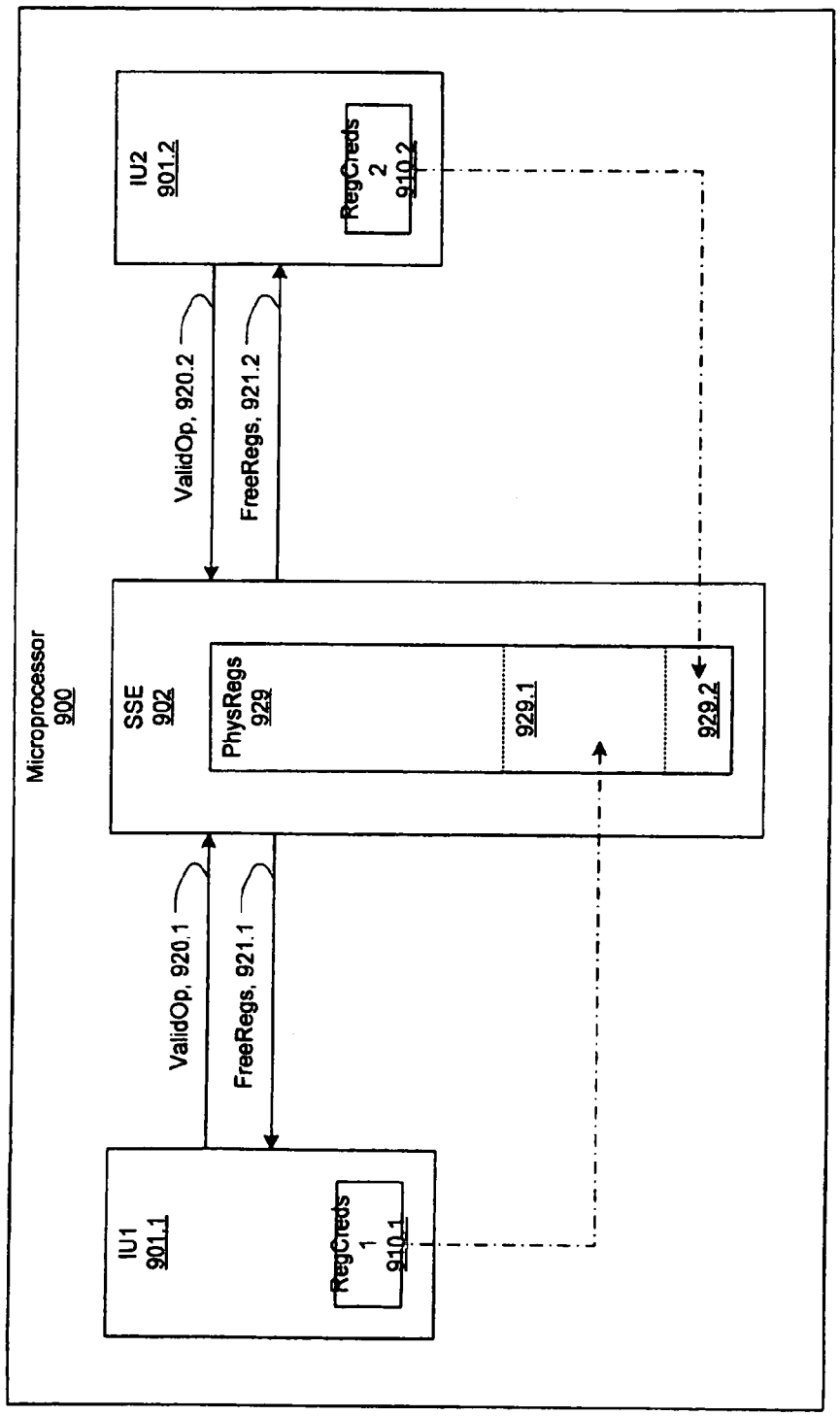
FIG. 9 is a block diagram illustrating an example of the credit scheme implemented in a microprocessor similar to the microprocessor illustrated by FIGS. 2 and 3 above, in accordance with one embodiment of the present invention.

FIG. 9 is a block diagram illustrating an example of the resource credit scheme implemented in a microprocessor similar to the microprocessor illustrated by FIGS. 2 and 3 above, in accordance with one embodiment of the present invention. As shown in FIG. 9, microprocessor 900 includes two Integer Units (IU) 901.1 and 901.2 sharing a coprocessor—shared Streaming SIMD Extensions (SSE) unit 902. SSE unit 902 includes physical registers for storing architectural and speculative machine state (Physical Registers 929).

IU 901.1 operates as a pipeline control element for a first processing core, and a first portion of the SSE physical registers (resource allocation 929.1) is allocated to operations associated with IU 901.1. IU 901.1 maintains Physical Register Credit Count 910.1 to track resources remaining in resource allocation 929.1. Similarly IU 901.2 operates as a pipeline control element for a second processing core, and a second portion of the SSE physical registers (resource allocation 929.2) are allocated to operations associated with IU 901.2. IU 901.2 maintains Physical Register Credit Count 910.2 to track resources remaining in resource allocation 929.2.

When IU 901.1 and IU 901.2 issue one or more operations to SSE unit 402, each requiring one of the physical registers, respective ValidOp signals 920.2 and 920.2 are sent to SSE unit 402. Correspondingly, physical registers allocated by SSE unit 902 to execute the operations reduce available physical registers in resource allocations 929.1 and 929.2. IU 901.1 and 901.2 accordingly decrement Physical Register Credit Counters 910.1 and 910.2. SSE unit 902 indicates releases of one or more physical registers allocated to IU 901.1 and 902.2 by FreeRegs signals 921.1 and 921.2. The released physical registers are available for subsequent operations. IU 901.1 and 901.2 increment Physical Register Credit Counters 910.1 and 910.2 accordingly.

In this example, SSE unit 902 operates as a consumer of data (i.e. the operations) and IU 901.1 and 901.2 operate as data producers. The ValidOp signals operate as Data Production signals to carry Data Production messages. The FreeRegs signals operate as Data Consumption signals to carry Data Consumption and Stop Production messages. The dynamic reallocation of resource scheme discussed above is applicable to allow SSE unit 902 to reallocate the physical registers between the producers IU 901.1 and 901.2.

Control logic to implement consumer functions (such as illustrated in FIG. 7) in SSE unit 902 may be built using any of a variety of techniques, including one or more hard-wired state machine(s), a micro-programmed processing element with an associated micro-program, and a combination thereof. Similarly, control logic to implement producer functions (such as illustrated in FIG. 7) in IU 901.1 and 901.2 may also be built using the same or similar techniques. All such variations are contemplated and will be readily understood by those of ordinary skill in the art.

Although the foregoing embodiments have been described in detail for purposes of illustration, the invention is not limited by the specific embodiments provided. There are many alternative ways of making and using the invention. The disclosed embodiments are illustrative and not restrictive.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; and other variations to be expected when implementing the concepts taught herein in accordance with the unique engineering and business constraints of a particular application.

The hardware, including any logic or transistor circuit, may be generated automatically by computer based on the description provided in a hardware description language, as known by those skilled in the art.

We claim:

1. A method for keeping track of resource allocation in a coprocessor by a master processor, comprising:
   assigning to the master processor a predetermined number of units of resources;
   keeping track of the number of units of resources being used by the coprocessor for executing operations sent from the master processor that have not completed; and
   stalling the master processor when the predetermined number of units of resources is reached.

2. A method as in claim 1, further comprising stalling the processor when the number of operations sent by the master processor to the coprocessor that have not been retired exceeds a predetermined maximum.

3. A method as in claim 1, further comprising, at every coprocessor cycle, reporting to the master processor a count of the resources that are made available during that coprocessor cycle.

4. A method as in claim 3, further comprising limiting the reporting of the count of the resources that are made available during the coprocessor cycle to a predetermined value, the predetermined value being greater or equal to a number of resources that can be allocated during a coprocessor cycle to operations sent from the master processor.

5. A method as in claim 4, further comprising in the coprocessor keeping track of an actual count of the resources allocated to the master processor that are associated with operations sent from the master processor that have not been retired.

6. A method as in claim 5, further comprising determining the count of the resources in the reporting base on the actual count and the count of the resources maintained in the master processor.

7. A microprocessor, comprising:
   a master processor; and
   a coprocessor, the coprocessor comprising a resource allocater that assigns to the master processor a predetermined number of resources, wherein the master processor comprises a counter that keeps track of a number of units of resources being used by the coprocessor for executing operations that are sent from the master processor to the coprocessor that have not retired and a circuit that stalls the master processor when the counter indicates that the predetermined number is reached.

8. A microprocessor as in claim 7, wherein the master processor stalls when the number of units of resources being used by the coprocessor for executing operations sent by the master processor to the coprocessor that have not been retired exceeds a predetermined maximum.

9. A microprocessor as in claim 7, wherein, at every coprocessor cycle, a reporting circuit in the coprocessor reports to the master processor a count of the resources that are made available during that coprocessor cycle.

10. A microprocessor as in claim 9, wherein the coprocessor limits the reporting of the count of the resources that are made available during the coprocessor cycle to a predetermined value, the predetermined value being greater or equal to a number of resources that can be allocated during a coprocessor cycle to operations sent from the master processor.

11. A microprocessor as in claim 10, further comprising in the coprocessor a second counter that keeps track of an actual count of the resources allocated to the master processor that are associated with operations sent from the master processor that have not been retired.

12. A microprocessor as in claim 11, further comprising a circuit for reconciling the counts in the first and second counters.

13. A microprocessor as in claim 12, further comprising a reporting circuit in the coprocessor that reports to the master processor, at every coprocessor cycle, a count of the available resources that are made available during that coprocessor cycle.

14. A microprocessor as in claim 7, wherein the count reported by the reporting circuit is limited to a predetermined value, the predetermined value being greater than or equal to a number of resources that can be allocated to operations sent from the master processor during one coprocessor cycle.

15. A microprocessor as in claim 14, further comprising in the coprocessor an ideal counter keeping track of an actual allocation map of the available resources allocated to the master processor that are associated with operations sent from the master processor that have not been retired.

16. A microprocessor as in claim 15, wherein the reporting circuit further comprising an external register that provides an allocation map that agrees in count of allocated resources with the counter in the master processor.

17. A microprocessor as in claim 16, wherein the reporting circuit reports to the master processor based on the allocation maps in the ideal counter and the external register.

18. A microprocessor as in claim 17, wherein the allocation maps are bit vectors.

19. A microprocessor having a master processor and a coprocessor, further comprising:
   in the master processor,
      means for assigning a predetermined number of available resources in the coprocessor associated with executing operations in the coprocessor;
      means for updating, for each operation sent from the master processor to the coprocessor, a count of the available resource that is associated with operations that are sent from the master processor that have not been retired in the coprocessor; and
      means for stalling the master processor when the means for updating indicates that the count reaches the predetermined number.

20. A microprocessor as in claim 19, further comprising in the coprocessor means for reporting to the master processor, at every coprocessor cycle, a count of the available resources that are made available during that coprocessor cycle.

21. A microprocessor as in claim 19, further comprising in the coprocessor means for reporting to the master processor, at every coprocessor cycle, a count of the available resources that are made available during that coprocessor cycle.

22. A microprocessor as in claim 21, further comprising in the coprocessor means for keeping track of an actual count of the available resources allocated to the master processor that are associated with operations sent from the master processor that have not been retired.

23. A microprocessor as in claim 22, wherein means for reporting further comprising an external counter that shadows the counter in the master processor.

24. A microprocessor as in claim 23, wherein the means for reporting reports to the master processor based on the values in the ideal counter and the external counter.

* * * * *